United States Patent [19]
Koh et al.

[11] Patent Number: 5,122,654
[45] Date of Patent: Jun. 16, 1992

[54] ERGONOMIC THUMB-ACTUATED TRACKBALL COMBINED WITH CONTROL SWITCHES

[75] Inventors: Kanae Koh, San Francisco; Josef Bismanovsky, Mountain View, both of Calif.

[73] Assignee: Logitech, Inc., Fremont, Calif.

[21] Appl. No.: 529,226

[22] Filed: May 25, 1990

[51] Int. Cl.⁵ .............................................. G01V 9/04
[52] U.S. Cl. ................................... 250/221; 340/710; 340/711
[58] Field of Search ................. 250/221, 229; 340/710, 340/709, 711

[56] References Cited

U.S. PATENT DOCUMENTS

| | | | |
|---|---|---|---|
| 4,538,476 | 9/1985 | Luque | 340/710 |
| 4,952,919 | 8/1990 | Nippoldt | 340/710 |
| 5,021,771 | 6/1991 | Lachman | 340/711 |

*Primary Examiner*—David C. Nelms
*Assistant Examiner*—T. Davenport
*Attorney, Agent, or Firm*—James E. Eakin

[57] ABSTRACT

An ergonomically designed trackball cursor pointing device in which the cursor movement ball and function switches or buttons are respectively positioned to allow movement of the ball by the thumb while simultaneously operating the switches. More particularly, the switches are placed at the top of the trackball and the ball is placed at the side, to complement the natural placement of the thumb and fingers of the operator thereover.

11 Claims, 5 Drawing Sheets

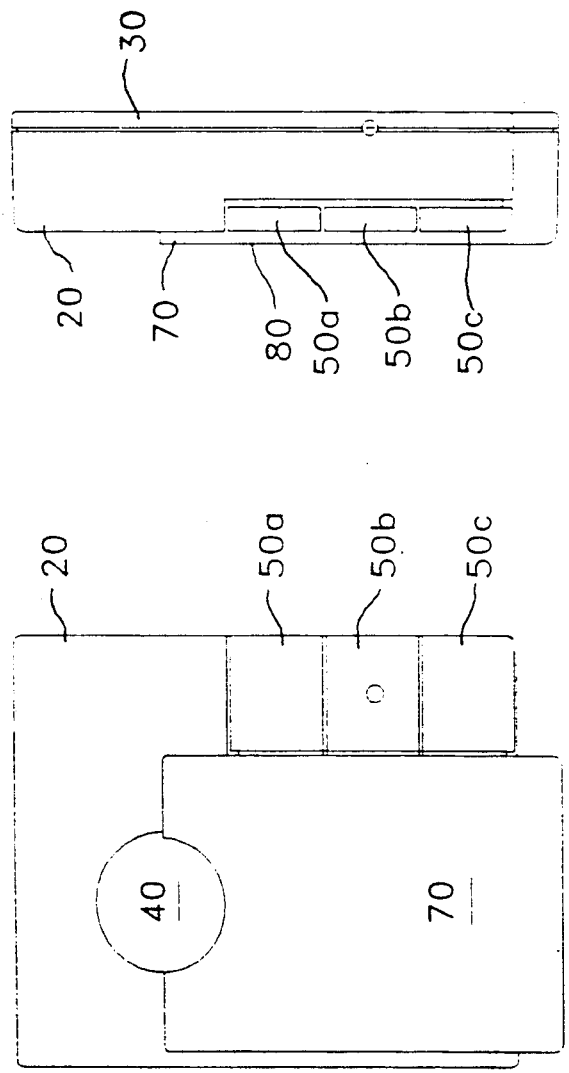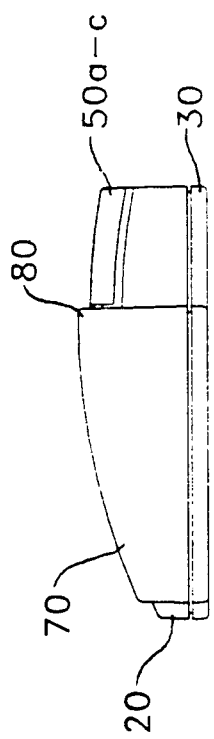
Fig. 2a
Fig. 2b
Fig. 2c

1

ERGONOMIC THUMB-ACTUATED TRACKBALL COMBINED WITH CONTROL SWITCHES

FIELD OF THE INVENTION

This application relates to video display cursor pointing devices for computers and workstations, and particularly relates to trackballs.

BACKGROUND OF THE INVENTION

Cursor pointing devices have been used in connection with various types of computers and computer-related devices for a number of years. In the personal computer and workstation marketplaces, electronic mice have become widely accepted for their ease of use in graphics and other programs, and their advantages over most other cursor pointing devices are well known.

The trackball has also achieved a reasonable degree of acceptance among computer and workstation users, although not to the extent that the electronic mouse has become accepted. In part, this relative lack of acceptance relates to the design of prior art trackballs, which are frequently cumbersome to use. A typical prior art trackball, such as described in U.S. Pat. No. 4,562,347, consists of an enlarged polymeric ball which is centrally located within, and protruding from, a housing. A plurality of buttons, or switches, is typically located somewhere on the housing, most often at the top of the trackball. In use, the trackball is rotated within the housing by either the palm or the fingers, thereby causing the cursor on the video display to move. Once the cursor is moved to the desired location, one or more of the buttons are pressed (as appropriate for whatever software package is being run) to cause some desired action. In some applications, particularly graphics software, it is necessary to depress a button and, while holding the button down, rotate the ball to move the cursor from a beginning location to an ending location. This action, referred to as "click, drag and release", occurs in many modern software applications. Once the cursor reaches the ending location, the button is released and a desired function is performed.

This "click, drag and release" function cannot be readily performed by existing trackballs. Prior art trackballs, in recognition of this limitation, have in at least some instances offered a "click lock" function. In this operation, a click lock function is turned on, the ball is rotated to move the cursor, and the click lock function is released. In ergonomic terms, this requires the operator to first move the hand to a position where the click lock can be actuated, followed by moving the hand to the ball itself and performing the necessary rotation, finally followed by moving the hand back to a position where the click lock can be released. These relatively time consuming and complex hand movements have presented a limitation in the prior art. Prior art trackballs have typically required that the manipulation of the ball itself be done by removing the fingers from the buttons, so that operation of the trackball continually requires repositioning of the hand to perform nearly every task. This has been found to be cumbersome and undesirable, and has limited the acceptance of the trackball. There has therefore been a long felt need for a trackball in which the ball could be simultaneously manipulated while operating the buttons.

SUMMARY OF THE INVENTION

The present invention provides an ergonomic design of trackball in which the ball is actuated by the thumb or other finger, allowing the remaining fingers to remain over the buttons during movement of the ball (and the corresponding movement of the cursor). By such an arrangement, the present invention overcomes one of the major limitations of prior art trackballs in that it allows simultaneous and continued rotation of the ball and actuation of one or more buttons, and provides a trackball which is accurate, easy to use, and comfortable during extended periods of use. In addition, like prior art trackballs, the present invention requires less desk space than an electronic mouse.

The trackball of the present invention comprises a housing. At one side of the housing and slightly lower than the vertical midpoint of the housing, a ball is disposed within a receptacle in the housing. The receptacle retains the ball within the housing. At the top of the housing a plurality of switches or buttons are disposed for actuation by the fingers. The upper surface of the housing is arcuate to permit the hand to rest naturally thereon, and to naturally place the fingers over the buttons and the thumb over the ball. Right hand and left hand versions may be provided.

It is therefore one object of the present invention to provide an ergonomic trackball.

It is another object of the present invention to provide a trackball wherein the ball is intended to be actuated by a single digit such as the thumb.

It is yet another object of the present invention to provide a trackball wherein the human hand, while at rest, is naturally positioned with the thumb over the trackball and the fingers over the buttons of the trackball.

These and other objects of the present invention may be better appreciated by the following Detailed Description of the Invention, taken together with the attached Figures.

FIGURES

FIG. 2a shows a top plan view of a trackball according to the present invention.

FIG. 2b shows a front elevational view of a trackball according to the present invention.

FIG. 2c shows a right side elevational view of a track ball according to the present invention.

DETAILED DESCRIPTION OF THE INVENTION

Figure 1:
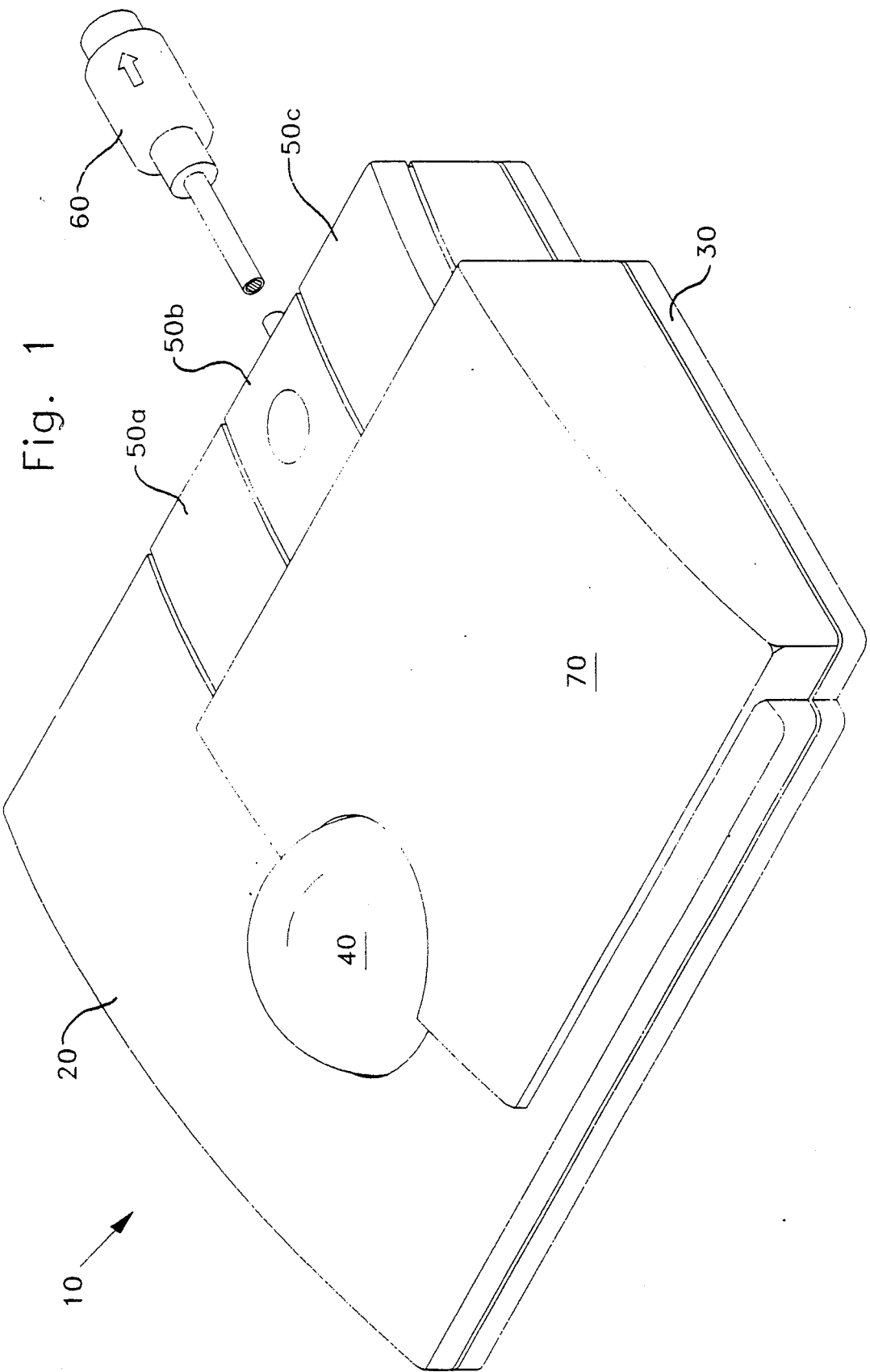
FIG. 1 shows a perspective view of a trackball according to the present invention.

Referring now to FIGS. 1, and 2a-2c, the trackball of the present invention may be better appreciated.

The trackball 10 comprises an upper housing 20, a lower housing 30, a ball 40, and a plurality of switches, sometimes referred to as buttons, 50a-c. The trackball 10 can be connected to a suitably configured port on a personal computer or workstation via a cord and connector 60.

As can be appreciated from FIGS. 1 and 2a, particularly, in the embodiment there shown, which is intended for use by the right hand, the ball 40 is displaced substantially to the left of the lateral midpoint of the trackball 10. Thus, for a trackball on the order of 135 mm wide, the center point of the trackball may be located at approximately 35 mm from the left edge. Similarly, for a trackball of approximately 110 mm from top to bottom, the center point of the trackball may be located on the order 65 millimeters from the top edge, that is, from the edge having the buttons 50a-c. Such an arrangement permits the right thumb to rest naturally over the ball 40, while also permitting the index, center and ring finger of the right hand to rest over the buttons 50a, 50b and 50c, respectively. In this manner, the ball may be freely manipulated by use of the thumb alone, leaving the fingers free at all times to actuate the buttons 50a-c.

To further assist in the ergonomics of the device, the upper housing 20 includes an elevated portion 70 in the preferred embodiment. The elevated portion 70 provides a pad on which a portion of the palm of the hand may be rested during operation of the trackball. As may be particularly appreciated from FIGS. 1 and 2c, the top surface of the upper housing 20 is arcuate, to accommodate the natural curvature of the hand. In some embodiments such curvature will not be required.

Referring next to FIG. 2b particularly, the height of the buttons 50a-c relative to the pad 70 may be better appreciated. It can readily be seen that the leading edge 80 of the pad 70 is disposed slightly above the buttons 50a-c, to permit a natural curvature of the fingers during operation. These numerous ergonomic features combine to provide a trackball having a substantially improved level of comfort during both short term and continuous operation.

Figure 3:
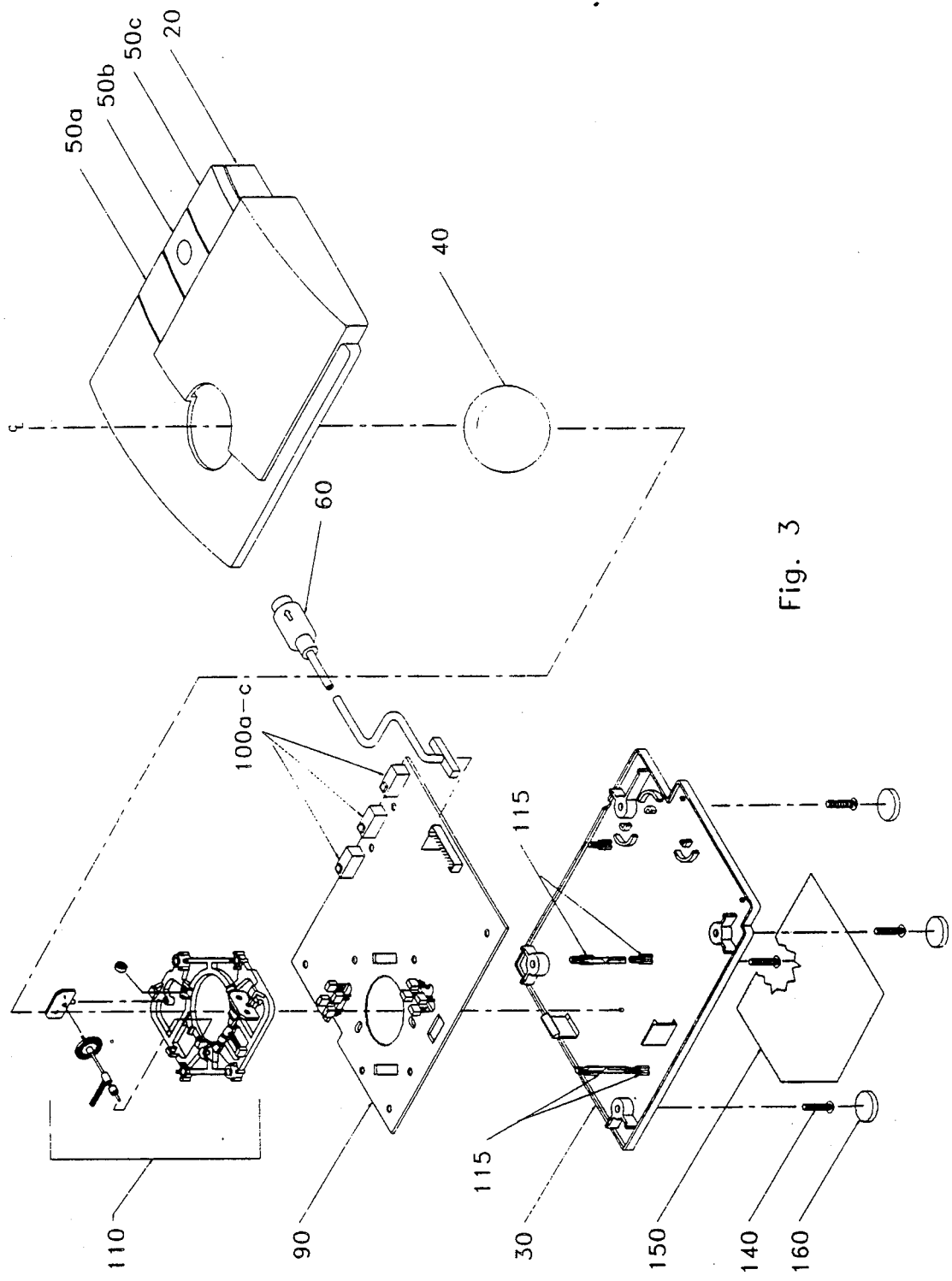
FIG. 3 shows an exploded perspective view of a track ball according to the present invention.

The details of the internal configuration of the trackball 10 can be best appreciated by referring to FIG. 3. Sandwiched between the upper housing 20 and lower housing 30 is a printed circuit board 90, on which reside four LEDs 90a and associated photodetectors 90b (such as phototransistors) as well as switches 100a-c, actuated by buttons 50a-c, respectively. A skeleton 110 is affixed to the upper portion of the PC board and retained in placed by pins 115 of the inner surface of the lower housing 30. The details of the skeleton 110, which includes a mask 110a mounted on a shaft 110b and positioned between pairs of LEDs 90a and photodetectors 90b wherein the shaft is maintained in rotatable engagement with the ball and rotation of the ball causes the mask to turn, forming a pair of quadrature signals at the photodetectors 90b, and support mechanism for the ball 40 may be better appreciated from copending U.S. pat. application Ser. No. 07/380,092, filed Jul. 14, 1989, entitled INVERTIBLE TRACKBALL, the relevant portions of which are incorporated by reference. Suitable firmware and software for digitizing movement of the ball, converting that movement to X-Y position information, and transmitting it to a suitable personal computer or workstation are disclosed in copending U.S. patent application Ser. No. 07/357,365, filed May 25, 1989, entitled Low Power Optoelectronic Device and Method, the relevant portions of which are incorporated by reference.

The ball 40 rests within the cradle 120 of the skeleton 110 and is retained in position by the inner surface 130 of the upper housing 20, as further described in the aforementioned U.S. patent application Ser. No. 07/380,092. The cord and connector 60 may be seen to connect directly to a suitable connector on the PC board 90, such as a serial port. Alternatively, a bus card may be used, although such an approach alters the design of the electronics contained within the trackball 10 itself.

The lower housing 30 may be affixed to the upper housing 20 by means of a plurality of screws 140, although other conventional means of affixing the upper and lower housings together are also acceptable. A label 150 may be applied over the screws 140, and feet 160 may further be applied to reduce unexpected movement of the trackball 10.

Figure 4:
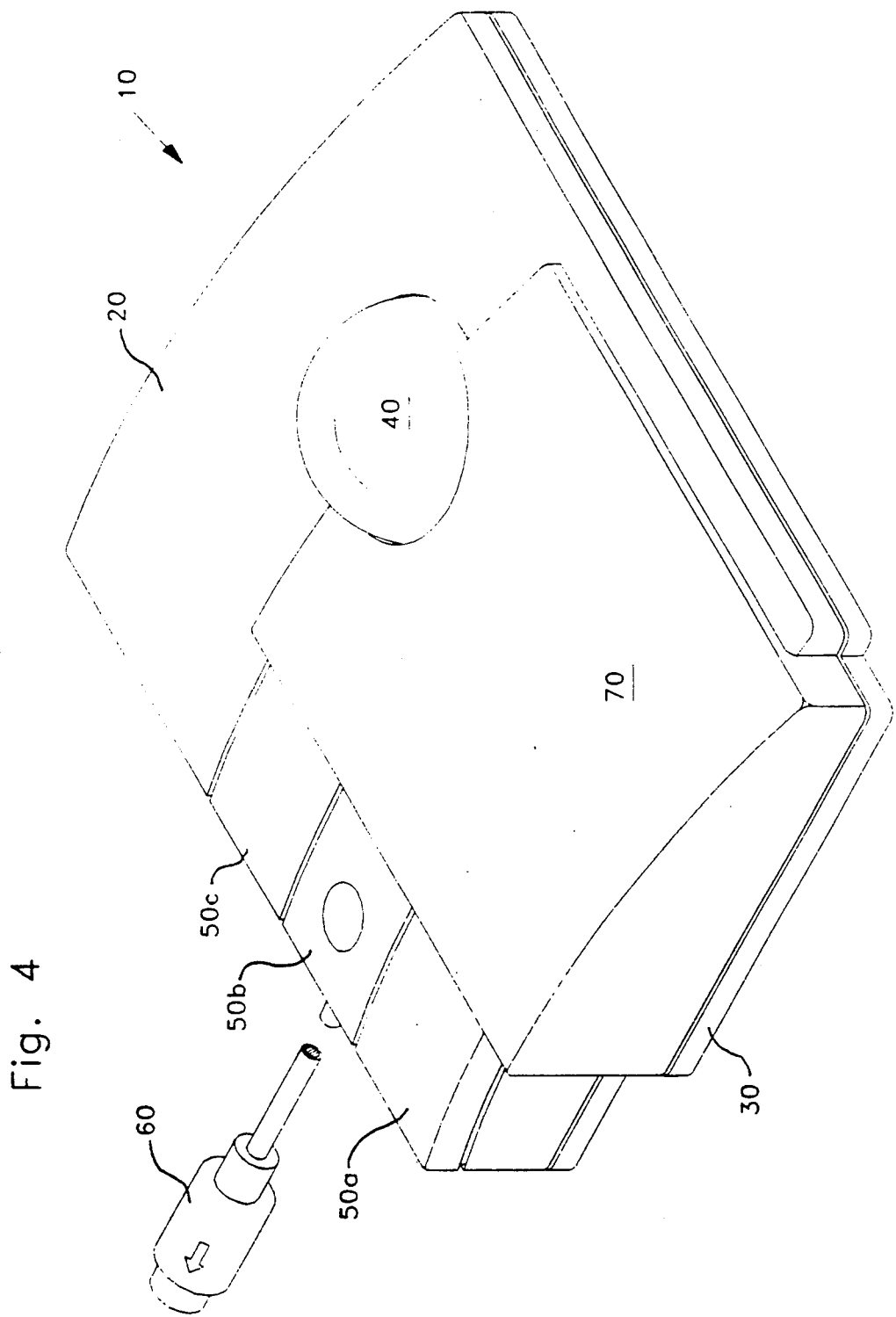
FIG. 4 shows a left handed version of the trackball of the present invention.

FIG. 4 shows a left handed version of the trackball 10 of the present invention.

Figure 5:
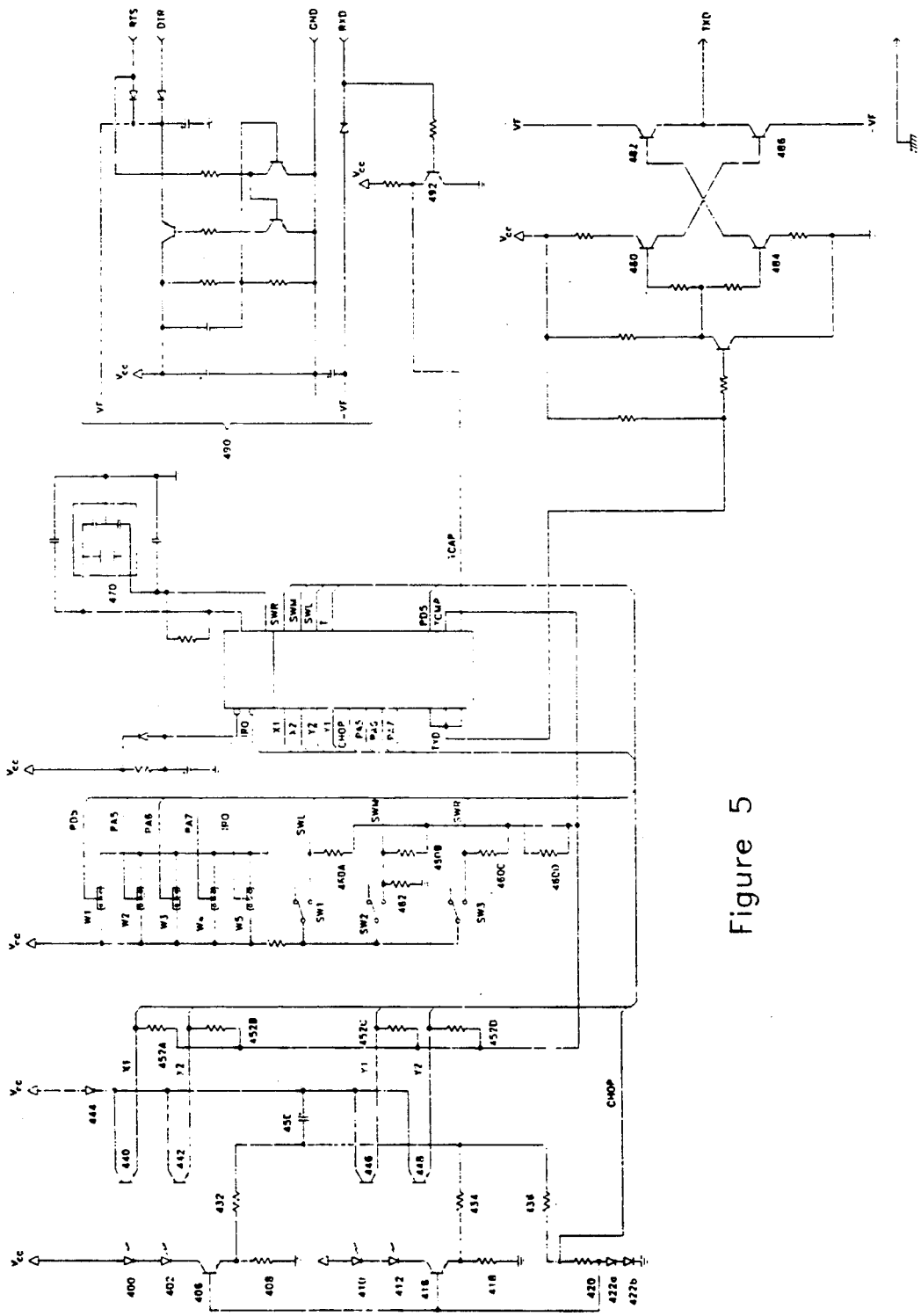
FIG. 5 shows in schematic block diagram form the electronics of the trackball of the present invention.

Referring now to FIG. 5, the electronics of the trackball of the present invention may be better understood. The embodiment herein described is intended for use with a serial port. Alternatively, a different configuration using a bus board can be implemented in a straightforward fashion. Power considerations present greater problems in the serial port design because less power is available when using the serial port as a power source. A pair of LED's 400 and 402 are connected in series and a voltage supply $V_{cc}$ is connected to the anode of the LED 400. The cathode of the LED 402 is connected to the collector of an NPN switching transistor 406, and the emitter of the transistor 406 is connected to ground through a current limiting transistor 408. As will becomes clearer hereinafter, the transistor 406 switches on and off to cause the LEDs 400 and 402 to be pulsed, resulting in light pulses being emitted.

Similarly, a second pair of LED's 410 and 412 are connected in series between $V_{cc}$ and the collector of transistor 414. The emitter of the transistor 414 is connected to ground through a current limiting resistor 418.

The bases of the transistors 406 and 416 and both connected between a resistor 420 and two diodes 422A and 422B, which in turn is connected to a CHOP line driven by a microprocessor 430. The microprocessor 430 is preferably a Motorola 6805 device, and particularly an MC68HC05P1. It can thus be appreciated that the bases of the transistors 406 and 416 are held two diode drops above ground and receive base drive when the CHOP line is activated.

. Similarly the emitters of the transistors 406 and 416 are connected to the CHOP line through, respectively, resistors 432 and 434, both of which are connected to the CHOP line through resistor 436. Thus, activation of the CHOP line switches the transistors 406 and 416 on, pulsing the LED's 400-402 and 410-412.

Physically juxtaposed to the LED's 400 and 402 are phototransistors 440 and 442, respectively, the collectors of which are tied to $V_{cc}$ through a diode 444. A second pair of phototransistors 446 and 448 are also tied to $V_{cc}$ through the diode 444. The junction of the collectors 440-442 and 446-448 are capacitively coupled to the junction of the resistors 432-434 and 436 by means of capacitor 450. The emitters of the transistors each provide an output signal to the microprocessor 430 on lines X1, X2, Y1 and Y2, respectively. Each of the line is connected through a resistor 452A-D, respectively, to a TCMP line from the processor 430. The TCMP line serves as a signal ground during normal operation, and may be used to test for a two button versus a three button mouse during initialization.

User selections are made by means of depressing the switches SW1, SW2 and SW3, although different numbers of switches may be provided in different designs. The output of the switches are provided to the processor 430 by means of lines SWL, SWM and SWR. Current limiting resistors 460A-C are also connected to the output of the switches SW1-SW3 and thence to the TCMP line of the microprocessor 430.

The input port and interrupt request are set by means of jumpers W1 through W5 in a manner well known in the art, and cause the appropriate signals to be provided to the processor 430 via lines IRQ, PA5, PA6, PA7 and PD5. The clock signal for the microprocessor is provided by a crystal 470 and associated biasing circuitry.

The output of the microprocessor 430 is provided to the host system (not shown) via the line TXD. The signal provided on the TXD line is latched by the latch circuit comprising cross-connected PNP transistors 480-480 and NPN transistors 482 and 484. Appropriate biasing circuitry is also provided. The TXD signal is then provided to the host processor on the TXD output line.

The signals incoming from the host processor (not shown) are buffered in a conventional manner using the circuitry shown generally at 490. In addition, the incoming RXD signal is buffered through a transistor 492 and biasing resistors 494 and 496, so that the RXD signal is provided to the TCAP line of the processor 430 from the collector of the transistor 492.

As noted previously, the firmware for driving the processor 430 can be understood from copending application Ser. No. 07/357,653, filed May 25, 1989, entitled Low Power Optoelectronic Device and Method. Generally, the LED's are pulsed, depending on the position of the and cause the phototransistors to provide data signals to the processor 430 indicative of movement of the ball. The processor then converts the signals representing movement of the ball into cursor movement or other signals, causing appropriate action to be taken on the video display, all in a conventional manner.

From the foregoing, the ergonomic improvements offered by the present invention can be better appreciated. The user's thumb naturally rests over the ball, with the palm resting on or near the pad 70. This is turn naturally places the fingers over the buttons 50a-c. In this arrangement, the user can readily depress one (or more, if the application calls for it) of the buttons 50, and move the ball 40 with the thumb while the buttons are depressed. Once the cursor is moved to the appropriate location, the buttons can be released without removing the thumb from the ball. The present invention thus provides a new, novel and unobvious device for control of a cursor in a personal computer or workstation, and overcomes a major shortcoming of prior art trackballs, thus satisfying a long felt need within the industry.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A trackball cursor pointing device comprising
   a lower housing member,
   a ball,
   skeleton means adapted to movably receive the ball in a portion thereof, the skeleton means including means for converting rotational movement of the ball to digital signals for communication to a personal computer or workstation and control switches for selectively transmitting control signals to the personal computer or workstation,
   an upper housing member fixedly connected to the lower housing member whereby the skeleton means and the ball are fixedly positioned therebetween, the upper housing member having a hole therein through which the ball protrudes to permit rotation of the ball by the user, and further having control means for selective actuation of the control switches, the hole and control means being positioned so that the thumb alone of a user's hand actuates the ball when the fingers of the user's same hand are positioned concurrently to actuate the control means.

2. A trackball cursor pointing device comprising
   a ball,
   a lower housing member for receiving the ball and converting rotational movement of the ball into digital signals for controlling a cursor in a personal computer or workstation, the lower housing member further having at least one control switch for sending predetermined control signals to the personal computer or workstation, and
   an upper housing member fixedly connected to the lower housing member whereby the ball is fixedly positioned therebetween, the upper housing member having a hole therein through which the ball protrudes to permit rotation of the ball by the user, and further having control means for selective actuation of the at least one control switch, the hole and control means being positioned so that the thumb of a user's hand rests on the ball when the fingers of the user's same hand are positioned to actuate the control means whereby the ball can be actuated solely by the thumb while the fingers are free concurrently to actuate the at least one control switch.

3. A trackball cursor pointing device comprising
   a ball,
   a lower housing member having encoder means for converting rotation of the ball into displacement signals for communication to a personal computer or workstation and at least one control switch for selective transmission of control signals to the personal computer or workstation,
   an upper housing member fixedly connected to the lower housing member whereby the ball is fixedly positioned therebetween, the upper housing member having an aperture with the ball protruding therethrough to permit rotation of the ball by the user, and further having control means for selective actuation of the at least one control switch, the ball and aperture being offset from the center to be actuated solely by the thumb, and the at least one control switch and the control means being offset from the center in the direction opposite the ball and positioned near the top of the upper housing for actuation by the fingers of the user while the thumb of the user actuates the ball.

4. The invention of claim 2 wherein the number of control switches is one and the control means comprises one control button.

5. The invention of claim 2 wherein the number of control switches is two and the control means comprises two control buttons.

6. The invention of claim 2 wherein the number of control switches is three and the control means comprises three control buttons.

7. The invention of claim 3 wherein the ball is offset to the left side of the upper housing and the control switches are located at the upper right side of the upper housing.

8. The invention of claim 3 wherein the ball is offset to the right side of the upper housing and the control switches are located at the upper left side of the upper housing.

9. The invention of claim 3 wherein the number of control switches is one and the control means comprises one control button.

10. The invention of claim 3 wherein the number of control switches is two and the control means comprises two control buttons.

11. The invention of claim 3 wherein the number of control switches is three and the control means comprises three control buttons.

* * * * *